US010889273B2

(12) United States Patent
Hasegawa (10) Patent No.: US 10,889,273 B2
(45) Date of Patent: Jan. 12, 2021

(54) BRAKE CONTROL DEVICE FOR VEHICLES WITH BAR HANDLE

(71) Applicant: NISSIN KOGYO CO., LTD., Tomi (JP)

(72) Inventor: Tetsuya Hasegawa, Tomi (JP)

(73) Assignee: NISSIN KOGYO CO., LTD., Nagano (JP)

( * ) Notice: Subject to any disclaimer, the term of this patent is extended or adjusted under 35 U.S.C. 154(b) by 211 days.

(21) Appl. No.: 15/919,574

(22) Filed: Mar. 13, 2018

(65) Prior Publication Data

US 2018/0265055 A1 Sep. 20, 2018

(30) Foreign Application Priority Data

Mar. 14, 2017 (JP) ................... 2017-048868

(51) Int. Cl.
*B60T 8/17* (2006.01)
*B60T 8/171* (2006.01)
(Continued)

(52) U.S. Cl.
CPC ............. *B60T 8/1706* (2013.01); *B60T 7/12* (2013.01); *B60T 8/171* (2013.01); *B60T 8/172* (2013.01);
(Continued)

(58) Field of Classification Search
CPC . B60G 17/015; B60T 8/34; B60T 8/00; B60T 8/17; B60T 8/171; B60T 8/1706;
(Continued)

(56) References Cited

U.S. PATENT DOCUMENTS 4,626,042 A 12/1986 Burckhardt
5,244,259 A 9/1993 Pickenhahn et al.
(Continued)

FOREIGN PATENT DOCUMENTS

JP S59140155 8/1984
JP 2584587 2/1997
JP 2004155412 6/2004

OTHER PUBLICATIONS

European Search Report for EP application No. 18161720.0-1012 dated Sep. 11, 2018, 6 pages.
(Continued)

*Primary Examiner* — Anthony R Jimenez
(74) *Attorney, Agent, or Firm* — Andrew M. Calderon; Roberts Calderon Safran & Cole, P.C.

(57) ABSTRACT

A brake fluid pressure control device for vehicles with bar handle which is configured to start a holding control of a fluid pressure of a wheel brake according to wheel deceleration calculated based on a wheel speed of the vehicle is provided. In the brake fluid pressure control device, the vehicle includes an acceleration sensor which is configured to detect acceleration in a front-rear direction of the vehicle, acceleration, detected by the acceleration sensor, which occurs in a rearward direction when the vehicle is decelerating is detected as a positive value, and the holding control is started when it is judged that the acceleration detected by the acceleration sensor is larger than or equal to a detection acceleration threshold value and the wheel deceleration is smaller than or equal to a wheel deceleration threshold value.

18 Claims, 6 Drawing Sheets

(51) Int. Cl.
  *B60T 8/176* (2006.01)
  *B60T 7/12* (2006.01)
  *B60T 8/172* (2006.01)
  *B60T 8/32* (2006.01)
  *B60T 8/1755* (2006.01)

(52) U.S. Cl.
  CPC ............ *B60T 8/176* (2013.01); *B60T 8/1755* (2013.01); *B60T 8/3225* (2013.01); *B60T 2201/16* (2013.01); *B60T 2230/00* (2013.01); *B60T 2250/04* (2013.01); *B60T 2270/10* (2013.01); *B60T 2270/30* (2013.01)

(58) Field of Classification Search
  CPC .... B60T 8/172; B60T 8/1755; B60T 8/17551; B60T 8/17554; B60T 8/176; B60T 8/261; B60T 8/28; B60T 8/32; B60T 8/321; B60T 8/3225; B60T 8/72; B60T 7/08; B60T 7/12; B60T 2201/16; B60T 2230/00; B60T 2250/04; B60T 2270/10; B60T 2270/30; B60W 2510/00; B60W 2510/0652; B60W 2510/18; B60W 2510/182; B60W 2710/18; B60W 2710/182; B60W 2710/0644; B60W 2710/00; B60W 2720/00; B60W 2720/10; B60W 2720/12; B60W 2720/14; B60W 2720/16; B60W 2720/18; B60W 2720/20; B60W 10/119; B60W 10/08; B60W 10/184; B60W 10/00; B60W 10/18; B60W 2720/30; B60W 30/02; B60W 30/04; B60W 30/045; B60W 30/08; B60W 30/085; B60W 30/18109; G05D 16/00; G05D 16/02; G05D 16/14; G05D 16/149; G05D 16/18; G05D 16/186; G05D 16/206; G05D 16/20; G05D 16/203; G05D 13/00; B60L 2240/00; B60L 2240/10; B60L 2240/12; B60L 2240/14; B60L 2240/16; B60L 2240/18; B60L 2240/20; B60L 2240/22; B60L 2240/24; B60L 2240/32; B60L 2240/40; B60L 2240/43; B60L 2240/465
  USPC .......................................................... 701/72
  See application file for complete search history.

(56) References Cited

U.S. PATENT DOCUMENTS

5,445,443 A  8/1995  Hauser et al.
2012/0179349 A1*  7/2012  Yamakado ........... B60W 10/119
  701/89

OTHER PUBLICATIONS

Japanese Office Action dated Oct. 15, 2019 for JP application No. 2017048868, 4 pages.

* cited by examiner

BRAKE CONTROL DEVICE FOR VEHICLES WITH BAR HANDLE

CROSS-REFERENCE TO RELATED APPLICATION

This application claims priority from Japanese Patent Application No. 2017-048868, filed on Mar. 14, 2017, the entire subject matter of which is incorporated herein by reference.

TECHNICAL FIELD

The present invention relates to a brake control device for vehicles with bar handle that controls braking of a vehicle with bar handle.

BACKGROUND

In vehicles with bar handle such as a motorcycle (hereinafter, also referred to merely as vehicle), fluid pressure control to reduce, raise or hold the brake fluid pressure by a brake control device for vehicles with bar handle is performed. Examples of the fluid pressure control include ABS (antilock-braking-system) control to suppress a slip of a wheel at the time of braking of the vehicle. In the system disclosed in Japanese Patent No. 2584587, when the inclined attitude angle (bank angle) of a motorcycle is larger than or equal to a predetermined threshold value, holding control to hold the braking pressure of the wheel before the lock pressure of the wheel is reached is performed as the ABS control.

However, in this type of vehicles with bar handle, if the holding control is performed in the neighborhood of a pressure at which the front wheel is locked during cornering, there is a possibility that the bank angle of the vehicle body unnaturally changes to make the behavior of the vehicle body unstable. That is, in the braking during cornering, appropriate holding control considering the bank angle of the vehicle body is required.

SUMMARY

The present invention is made in view of the above-mentioned circumstances, and an object thereof is to provide a brake control device for vehicles with bar handle capable of improving the stability of a vehicle with bar handle by performing the holding control at an appropriate time according to the bank angle at the time of cornering.

According to an aspect of the invention, there is provided a brake control device for vehicles with bar handle which is configured to perform a holding control to hold a brake fluid pressure that acts on a vehicle brake of a wheel of the vehicle, the brake control device comprising: a bank angle obtaining unit which is configured to obtain a bank angle of the vehicle; a deceleration obtaining unit which is configured to obtain a deceleration of the wheel; and a control unit which is configured to start the holding control when the deceleration reaches a holding control threshold value, the control unit which is configured to correct the holding control threshold value to a low deceleration side when the obtained bank angle increases.

DETAILED DESCRIPTION

Hereinafter, citing a preferred embodiment, a brake control device for vehicles with bar handle according to the present invention will be described in detail with reference to the attached drawings.

Figure 1:
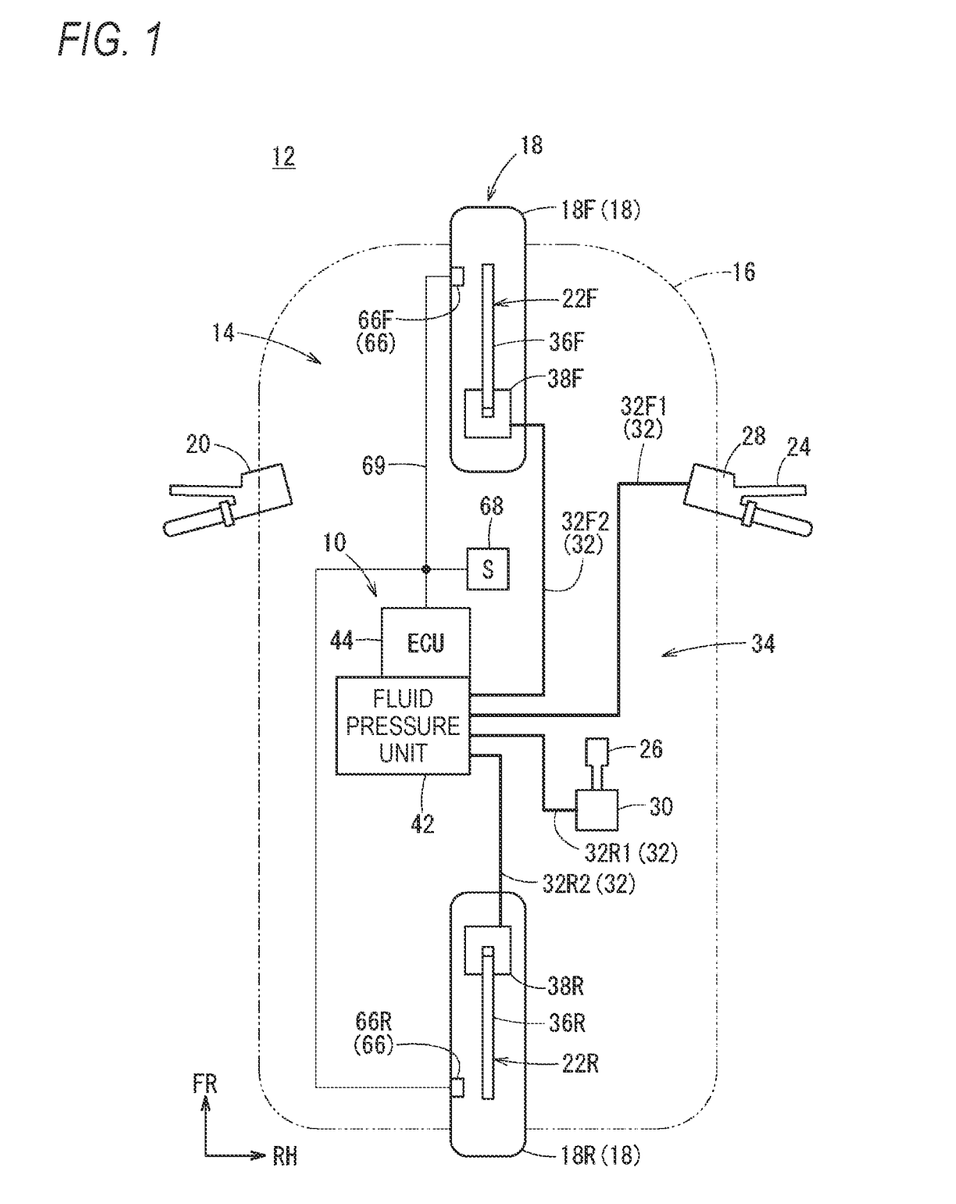
FIG. 1 is a schematic structural view of a vehicle with bar handle mounted with a brake control device for vehicles with bar handle according to an embodiment of the present invention.

As shown in FIG. 1, a brake control device 10 according to the embodiment of the present invention is mounted on a vehicle with bar handle 12, and controls the operation of a brake system 14 (wheel brake). Hereinafter, for convenience of explanation, the brake control device 10 will be referred to as merely control device 10. Moreover, as the vehicle with bar handle 12 (vehicle 12), a motorcycle, a motor tricycle and the like are cited, and in the following, description will be given with a motorcycle as an example.

The control device 10 performs the fluid pressure control (ABS control: reduction, raising or holding of the brake fluid pressure) as required. This fluid pressure control includes the holding control (ABS control) to suppress a slip of a wheel 18 by appropriately controlling the braking forces of the front wheel and the rear wheel by holding the brake fluid pressure applied to the wheel 18.

In particular, the control device 10 according to the present embodiment improves the stability of the vehicle 12 in the cornering state by enabling the holding control to be performed at an early stage when a brake operation is performed by the driver while the vehicle 12 is cornering. In the following, for the facilitation of understanding of this control device 10, first, the vehicle 12 and the brake system 14 will be described.

The vehicle 12 is provided with a vehicle body 16 and the wheel 18 (a front wheel 18F, a rear wheel 18R). The vehicle body 16 is provided with a traveling driving device (not shown) such as an engine that drives the rear wheel 18R, and is provided with a bar handle 20 with which the driver operates the traveling direction of the vehicle 12. The vehicle 12 turns in a desired direction by the bar handle 20 being operated or the vehicle body 16 itself being inclined by the driver.

The brake system 14 appropriately brakes the front wheel 18F and the rear wheel 18R under the control of the control device 10. This brake system 14 includes the control device 10, a front wheel brake 22F, a rear wheel brake 22R, a brake lever 24, a brake pedal 26, a first master cylinder 28 and a second master cylinder 30. And a fluid pressure system 34 of the brake fluid pressure formed of brake fluid piping 32 and the control device 10 is provided between the front wheel brake 22F and the first master cylinder 28 and between the rear wheel brake 22R and the second master cylinder 30.

The front wheel brake 22F is provided with a front wheel disk 36F attached to the front wheel 18F to rotate together with the front wheel 18F and a front wheel caliper 38F that causes a pad (not shown) sandwiching the front wheel disk 36F by the brake fluid pressure to proceed and recede. Likewise, the rear wheel brake 22R is provided with a rear wheel disk 36R attached to the rear wheel 18R to rotate together with the rear wheel 18R and a rear wheel caliper 38R that causes a pad (not shown) sandwiching the rear wheel disk 36R by the brake fluid pressure to proceed and recede.

The brake lever 24 is provided on one side (right side in FIG. 1) of the bar handle 20, and is connected to the first master cylinder 28 attached to the bar handle 20 similarly. The first master cylinder 28 applies to the fluid pressure system 34 a brake fluid pressure responsive to the operation force of the brake lever 24 by the driver.

The brake pedal 26 is provided in a predetermined position of the vehicle body 16, and is connected to the second master cylinder 30 attached to the vehicle body 16. The second master cylinder 30 applies to the fluid pressure system 34 a brake fluid pressure responsive to the pressing operation force of the brake pedal 26 by the driver.

The piping 32 of the fluid pressure system 34 includes first piping 32F1 connecting between the first master cylinder 28 and the control device 10, front wheel brake piping 32F2 between the control device 10 and the front wheel brake 22F, second piping 32R1 connecting between the second master cylinder 30 and the control device 10, and rear wheel brake piping 32R2 connecting between the control device 10 and the rear wheel brake 22R.

The control device 10 is provided with a fluid pressure unit 42 and an ECU (electric control unit) 44 that controls the fluid pressure unit 42. Inside the fluid pressure unit 42, a fluid passage 40 constituting the fluid pressure system 34 by brake fluid channels and various parts is provided. To the input port and the output port of the fluid pressure unit 42, the first piping 32F1, the front wheel brake piping 32F2, the second piping 32R1 and the rear wheel brake piping 32R2 are connected.

Figure 2:
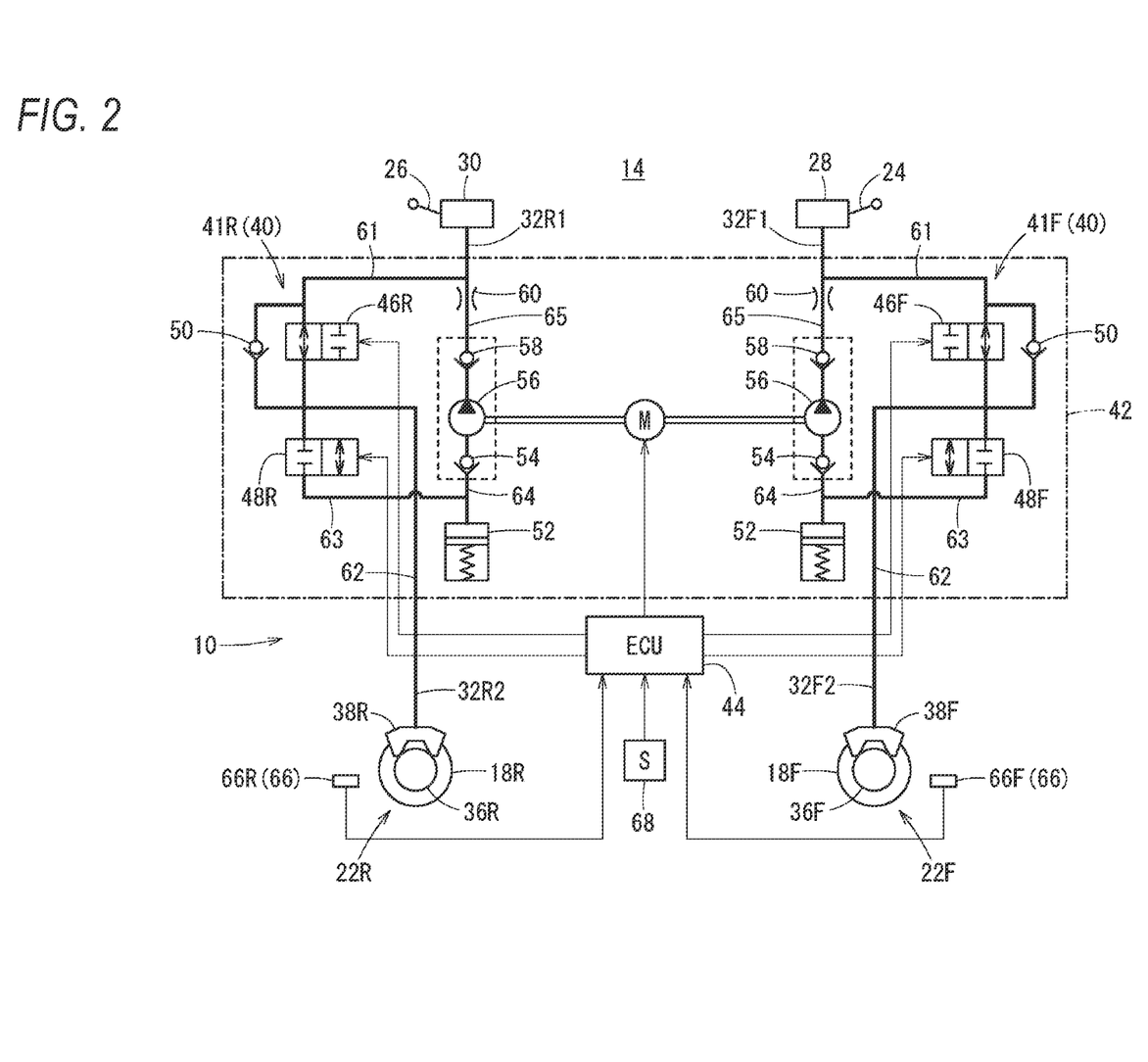
FIG. 2 is a circuit diagram of a fluid pressure circuit of the brake control device for vehicles with bar handle.

As shown in FIG. 2, the fluid passage 40 is provided with a front wheel brake channel 41F making the first piping 32F1 and the front wheel brake piping 32F2 communicate with each other and a rear wheel brake channel 41R making the second piping 32R1 and the rear wheel brake piping 32R2 communicate with each other. The front wheel brake channel 41F and the rear wheel brake channel 41R are basically formed so as to be the same, and in the following description, the structure of the front wheel brake channel 41F will be described representatively.

In appropriate positions of the front wheel brake channel 41F, an inlet valve 46F (an inlet valve 46R on the rear wheel brake channel 41R), an outlet valve 48F (an outlet valve 48R on the rear wheel brake channel 41R), a check valve 50, a reservoir 52, a suction valve 54, a pump 56, a discharge valve 58, an orifice 60 and the like are provided. Moreover, the front wheel brake channel 41F has five fluid channels 61, 62, 63, 64 and 65.

To lead the brake fluid pressure to the inlet valve 46F, the channel 61 establishes communication from the input port to which the first piping 32F1 on the side of the first master cylinder 28 is connected, to one end of the inlet valve 46F.

The channel 62 establishes communication from the other end of the inlet valve 46F to the outlet port to which the front wheel brake piping 32F2 on the side of the front wheel caliper 38F is connected.

The channel 63 establishes communication from the channel 61 to the reservoir 52. The channel 63 is provided with the outlet valve 48F.

The channel 64 establishes communication from the reservoir 52 to the suction side of the pump 56. The channel 65 establishes communication from the discharge side of the pump 56 to the channel 61. The channel 65 is provided with the orifice 60.

The inlet valve 46F is a normally open electromagnetic valve, and is provided between the first master cylinder 28 and the front wheel caliper 38F (between the channel 61 and the channel 62). The inlet valve 46F allows the transmission of the brake fluid pressure from the first master cylinder 28 to the front wheel caliper 38F by being open in normal times when the ABS control (fluid pressure control) is not started. On the other hand, the inlet valve 46F shuts off the brake fluid pressure applied from the brake lever 24 to the front wheel brake 22F through the first master cylinder 28 by being closed when the front wheel 18F is about to slip in the ABS control.

The outlet valve 48F is a normally closed electromagnetic valve, and is provided between the front wheel caliper 38F and the reservoir 52 (the channel 63). The outlet valve 48F, which is closed when the ABS control is inactive, makes the brake fluid pressure applied to the front wheel brake 22F escape to the reservoir 52 by being opened when the front wheel 18F is about to slip in the ABS control.

The check valve 50 is a valve that allows only the inflow of the brake fluid from the front wheel caliper 38F to the first master cylinder 28, and is connected in parallel to the inlet valve 46F. Thereby, when the input of the fluid pressure from the first master cylinder 28 is released, even if the inlet valve 46F is closed, the flow of the brake fluid from the side of the front wheel caliper 38F to the first master cylinder 28 is allowed.

The reservoir 52 stores the brake fluid that flows by the outlet valve 48F being opened. The pump 56 is provided with the suction valve 54 and the discharge valve 58, is operated by a motor M provided inside the fluid pressure unit 42, and has the function of sucking the brake fluid stored in the reservoir 52 and returning (discharging) the brake fluid to the side of the first master cylinder 28. Moreover, the orifice 60 absorbs the pulsation of the brake fluid discharged to the side of the first master cylinder 28 through the discharge valve 58.

As shown in FIGS. 1 and 2, the vehicle 12 is provided with a front wheel speed sensor 66F that detects the speed (front wheel speed FV) of the front wheel 18F and a rear wheel speed sensor 66R that detects the speed (rear wheel speed RV) of the rear wheel 18R. Hereinafter, the front wheel speed sensor 66F and the rear wheel speed sensor 66R are collectively referred to also as wheel speed sensors 66. The wheel speed sensors 66 are communicably connected to the control device 10 through communication lines 69. In FIGS. 1 and 2, the channels of the brake fluid are drawn by the thick solid lines, and the communication lines 69 that transmit signals of sensors and the like are drawn by the thin solid lines.

Further, the vehicle 12 is provided with a bank angle sensor 68 that detects a bank angle θ which is the inclined state of the vehicle 12. In the present embodiment, the bank angle sensor 68 is structured as a sensor group formed of a combination of an acceleration sensor 68a and an angular speed sensor 68b attached to the vehicle 12. The bank angle sensor 68 is not limited to this structure but a known sensor may be applied; for example, a known inclination angle sensor may be applied.

As the acceleration sensor 68a, a sensor capable of detecting an acceleration of not less than three axes is applied, and in the present embodiment, the acceleration sensor 68a has the function of detecting an acceleration applied in the horizontal direction (width direction) at least in a front view of the vehicle body 16. Moreover, as the angular speed sensor 68b, a gyroscope sensor that detects a roll angular speed and a yaw angular speed as the angular speed of the vehicle body 16 is applied. The acceleration sensor 68a and the angular speed sensor 68b are communicably connected to the control device 10 through the communication lines 69.

The ECU 44 of the brake system 14 (the control device 10) is structured as a computer (including a microcontroller) provided with a non-illustrated processor, memory and input-output interface. The ECU 44 is structured as the control unit of the present embodiment for controlling the operation of the fluid pressure unit 42 by the processor arithmetically processing a program stored in the memory. In particular, the ECU 44 performs the fluid pressure control to suppress a slip by appropriately adjusting the brake fluid pressure when it is determined that the wheel 18 is about to slip by the braking force in a state where the vehicle 12 is cornering at a curve or the like on a traveling road.

Figure 3:
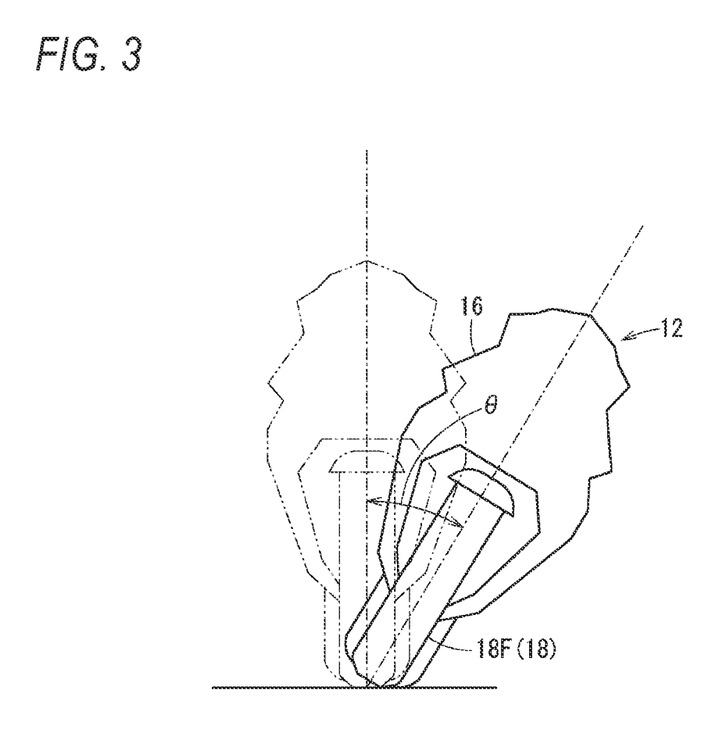
FIG. 3 is an explanation view showing the bank angle of the vehicle with bar handle.

As shown in FIG. 3, the driver inclines the attitude of the vehicle body 16 rightward or leftward when the vehicle 12 turns to the right or the left. Thereby, a force in the horizontal direction is applied to the vehicle 12 according to the bank angle $\theta$. When the driver's braking operation is performed while the vehicle 12 is cornering, the vehicle 12 decelerates to cause a deceleration, so that a force in the front-back direction is applied in a manner so as to be combined with the force in the horizontal direction.

The ECU 44 is structured so as to suppress a slip of the wheel 18 by adjusting the brake fluid pressure when a brake operation is performed by the driver during cornering and the wheel 18 is about to slip.

Figure 4:
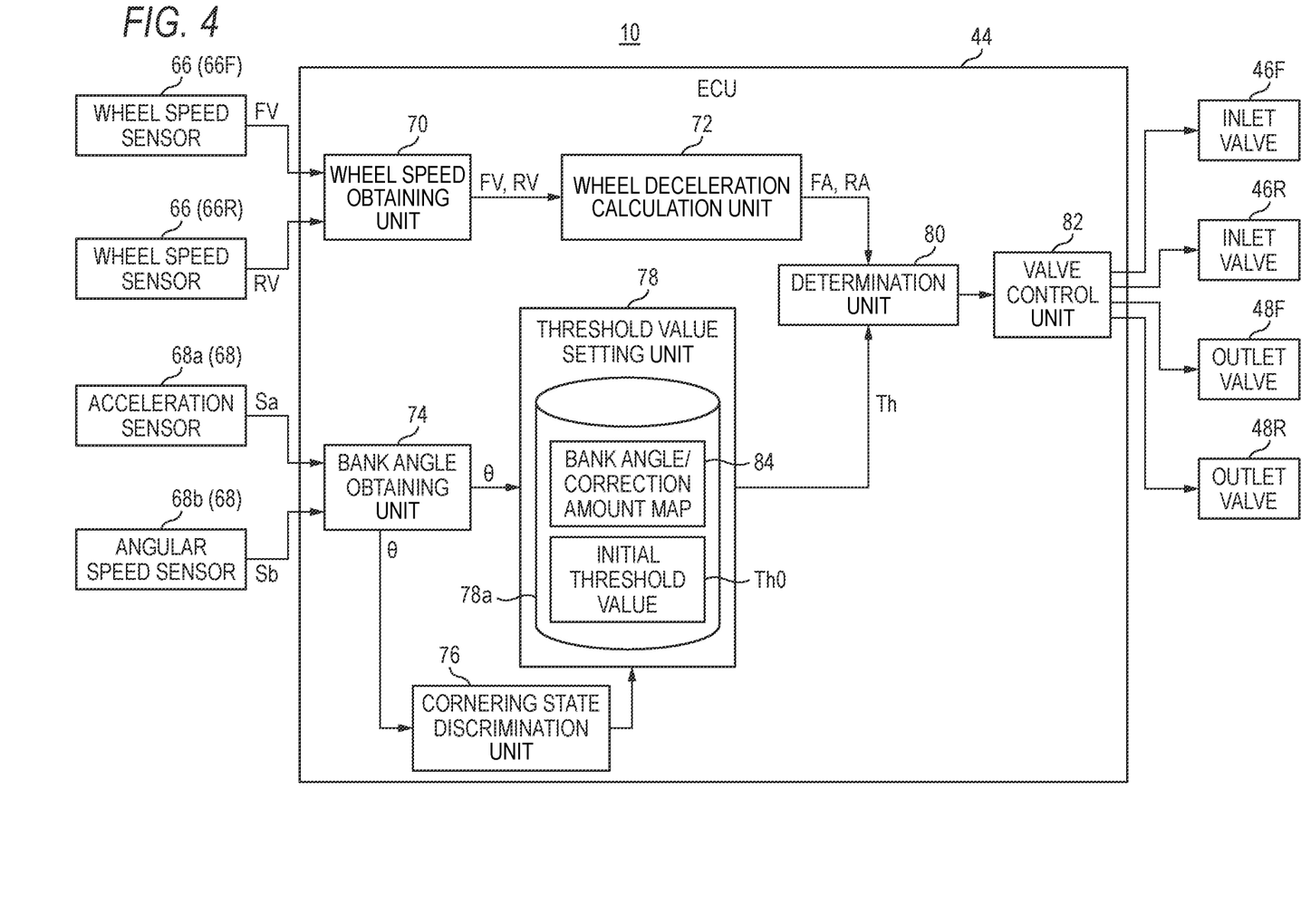
FIG. 4 is a block diagram of an ECU of the brake control device for vehicles with bar handle.

For this reason, as shown in FIG. 4, a wheel speed obtaining unit 70, a wheel deceleration calculation unit 72, a bank angle obtaining unit 74, a cornering state discrimination unit 76, a threshold value setting unit 78, a determination unit 80 and a valve control unit 82 are provided inside the ECU 44.

The wheel speed obtaining unit 70 receives the detection value from the wheel speed sensor 66 (the front wheel speed sensor 66F, the rear wheel speed sensor 66R). Then, the wheel speed obtaining unit 70 temporarily stores the received detection value in the memory as information on the front wheel speed FV and the rear wheel speed RV, and outputs the front wheel speed FV and the rear wheel speed RV to the wheel deceleration calculation unit 72.

The wheel deceleration calculation unit 72 is the deceleration obtaining unit for calculating the deceleration of the wheel 18, and is capable of obtaining the deceleration by differentiating the wheel speed of the wheel 18 (calculating the change rate of a predetermined time interval). In the present embodiment, the wheel deceleration calculation unit 72 calculates a front wheel deceleration FA actually applied to the front wheel 18F from the front wheel speed FV and calculates a rear wheel deceleration RA actually applied to the rear wheel 18R from the rear wheel speed RV. The deceleration obtaining unit may obtain the deceleration based on a different method (detection of the acceleration sensor, etc.).

Receiving a detection value Sa of the acceleration sensor 68a and a detection value Sb of the angular speed sensor 68b, the bank angle obtaining unit 74 calculates the bank angle $\theta$ which is the inclined attitude of the vehicle body 16 from these detection values Sa and Sb. In this case, the bank angle obtaining unit 74 calculates the bank angle $\theta$ by combining the acceleration applied in the horizontal direction of the vehicle 12 contained in the detection value Sa and the components of the roll angular speed and the yaw angular speed contained in the detection value Sb. Then, the bank angle obtaining unit 74 temporarily stores the calculated bank angle $\theta$ in the memory and outputs the bank angle $\theta$ to the cornering state discrimination unit 76 and the threshold value setting unit 78.

The cornering state discrimination unit 76 discriminates the cornering state or the straightly traveling state of the vehicle 12, or the like based on the received bank angle $\theta$. The cornering state discrimination unit 76 has an angle threshold value (not shown) corresponding to the bank angle $\theta$, and discriminates the cornering state of the vehicle 12 when the bank angle $\theta$ is larger than or equal to a predetermined angle threshold value and the state continues for a predetermined time. On the other hand, the cornering state discrimination unit 76 discriminates the straightly traveling state of the vehicle 12 when the bank angle $\theta$ is less than the predetermined angle threshold value or the state where the bank angle $\theta$ is larger than or equal to the predetermined angle threshold value is canceled immediately.

The threshold value setting unit 78 is set a holding control threshold value Th for determining whether to perform the holding control (ABS control) of the brake system 14 during cornering or not. That is, the holding control is performed by comparing and determining the holding control threshold value Th with the front wheel deceleration FA or the rear wheel deceleration RA at the determination unit 80 described later. For this reason, the holding control threshold value Th is set by a value corresponding to the deceleration (minus acceleration).

Figure 5:
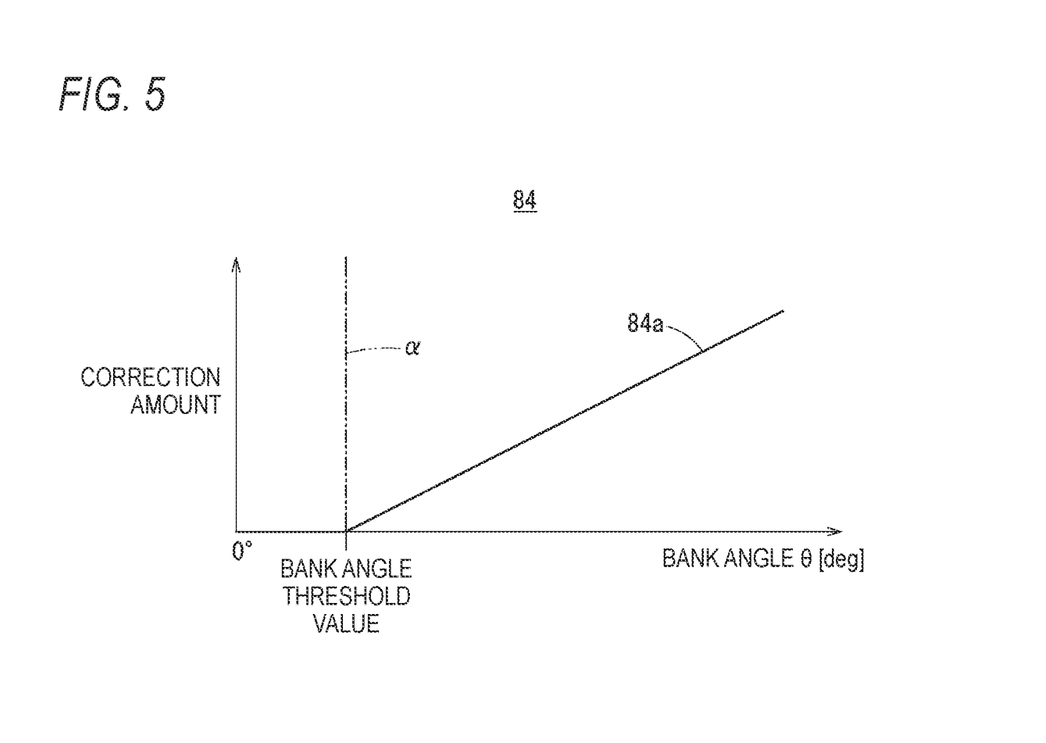
FIG. 5 is a graph showing an example of a bank angle/correction amount map according to the embodiment.

Inside the threshold value setting unit 78, a storage unit 78a (the storage area of the memory) storing a bank angle/correction amount map 84 is provided. As shown in FIG. 5, the bank angle/correction amount map 84 can be shown in a graphic form with the horizontal axis as the bank angle $\theta$ and the vertical axis as the correction amount. The correction line 84a in FIG. 5 is set so that when the bank angle $\theta$ is in a range from 0 degrees to a bank angle threshold value $\alpha$, the correction amount is 0 and when the bank angle $\theta$ is larger than or equal to the bank angle threshold value $\alpha$, the correction amount linearly increases as the bank angle $\theta$ increases. The association function of the bank angle $\theta$ and the correction amount may be arbitrarily designed; for example, the bank angle $\theta$ and the correction amount may be associated nonlinearly (in a polynomial function) by experiment or the like.

The threshold value setting unit 78 stores in the storage unit 78a an initial threshold value Th0 of the holding control threshold value Th when the bank angle $\theta$ is 0 degrees, that is, when the vehicle 12 is in the straightly traveling state. This initial threshold value Th0 is a predetermined value for starting the holding control when a deceleration occurs in the straightly traveling state of the vehicle 12. At the time of cornering, when the correction amount is set with the bank angle $\theta$ as the argument, the threshold value setting unit 78 calculates a threshold value after correction (corrected threshold value Th1) moved to the low deceleration side by adding this correction value to the initial threshold value Th0. Since the corrected threshold value Th1 is lower in deceleration than the initial threshold value Th0, when the deceleration increases by the brake operation during cornering, the holding control can be started at an early stage.

That is, as the holding control threshold value Th, when the bank angle $\theta$ is lower than the bank angle threshold value $\alpha$, the threshold value setting unit 78 outputs the initial threshold value Th0, and when the bank angle $\theta$ is larger than or equal to the bank angle threshold value $\alpha$, the threshold value setting unit 78 outputs the corrected threshold value Th1 corrected according to the bank angle θ.

The determination unit 80 compares the actual deceleration of the front wheel 18F (the front wheel deceleration FA) with the received holding control threshold value Th (the initial threshold value Th0, the corrected threshold value Th1) to determine in what state the front wheel deceleration FA is in with respect to the holding control threshold value Th. Specifically, when the front wheel deceleration FA becomes higher in deceleration than the holding control threshold value Th (acceleration lower than the holding control threshold value Th), the start of the holding control is determined.

On the other hand, receiving the result of the determination by the determination unit 80, the valve control unit 82 performs opening and closing of the inlet valve 46F and the outlet valve 48F of the fluid pressure unit 42. In this case, the valve control unit 82 switches opening and closing of these valves individually by the pulse outputs to the inlet valve 46F and the outlet valve 48F.

For example, the valve control unit 82 holds the brake fluid pressure (caliper pressure) applied to the front wheel caliper 38F by closing the normally open inlet valve 46F when the start of the holding control is determined by the determination unit 80. Moreover, in the holding control, the brake fluid pressure may be temporarily raised after the elapse of a certain period of time. In this case, the valve control unit 82 opens the inlet valve 46F to thereby allow again the transmission of the brake fluid pressure to the front wheel caliper 38F.

When a slip is about to occur on the wheel 18 even though the holding control is performed, by opening the normally closed outlet valve 48F, the brake fluid is made to escape to the reservoir 52 to reduce the pressure. Further, when a state where the front wheel deceleration FA is lower than the holding control threshold value Th is determined by the determination unit 80, while the outlet valve 48F is closed, the inlet valve 46F is opened to raise the caliper pressure. Further, the valve control unit 82 re-performs the holding control when the front wheel deceleration FA becomes higher than the holding control threshold value Th again.

The ECU 44 has the threshold value setting unit 78, the determination unit 80 and the valve control unit 82 also for the rear wheel 18R as function portions similar to the above-described ones (the wheel speed obtaining unit 70, the wheel deceleration calculation unit 72, the bank angle obtaining unit 74 and the cornering state discrimination unit 76 are common). That is, the ECU 44 sets the holding control threshold value Th for the rear wheel 18R based on the bank angle θ, and compares the holding control threshold value Th and the rear wheel deceleration RA to determine the execution of the holding control of the rear wheel 18R. Therefore, the ECU 44 can optimize the overall braking force of the vehicle 12 by individually controlling the front wheel 18F and the rear wheel 18R when the vehicle 12 is cornering.

The control device 10 according to the present embodiment is basically structured as described above, and its operation and advantage will be described below. In the following operation description, the control on the front wheel 18F will be representatively described similarly to the above.

The driver inclines the vehicle body 16 for cornering at a curve or the like on a traveling road while the vehicle 12 is traveling. Therefore, the bank angle θ of the vehicle body 16 varies during cornering. During the traveling of the vehicle 12, as shown in FIG. 4, the bank angle obtaining unit 74 of the ECU 44 (the control device 10) receives the detection values Sa and Sb from the acceleration sensor 68a and the angular speed sensor 68b, and steadily calculates the bank angle θ. Moreover, the cornering state discrimination unit 76 discriminates the cornering state or the straightly traveling state of the vehicle 12 based on the result of the detection of the bank angle θ. Then, when the cornering state discrimination unit 76 discriminates the cornering state, the threshold value setting unit 78 sets the holding control threshold value Th.

In this case, the threshold value setting unit 78 reads the bank angle/correction amount map 84 stored in the storage unit 78a. Further, the threshold value setting unit 78 extracts the correction amount from the bank angle θ with reference to the bank angle/correction amount map 84 being read (see also FIG. 5). After extracting the correction amount, the threshold value setting unit 78 adds the correction amount to the initial threshold value Th0 to calculate the corrected threshold value Th1, and outputs it to the determination unit 80. Moreover, the holding control threshold value Th is consecutively updated according to the bank angle θ of the vehicle body 16 that changes during cornering.

On the other hand, the wheel speed obtaining unit 70 of the ECU 44 receives the front wheel speed FV and the rear wheel speed RV from the front wheel speed sensor 66F and the rear wheel speed sensor 66R. With this reception, the wheel deceleration calculation unit 72 calculates the front wheel deceleration FA from the front wheel speed FV, and outputs the front wheel deceleration FA to the determination unit 80. The determination unit 80 compares the front wheel deceleration FA with the holding control threshold value Th (the initial threshold value Th0, the corrected threshold value Th1) to determine whether to perform the holding control or not.

Figure 6:
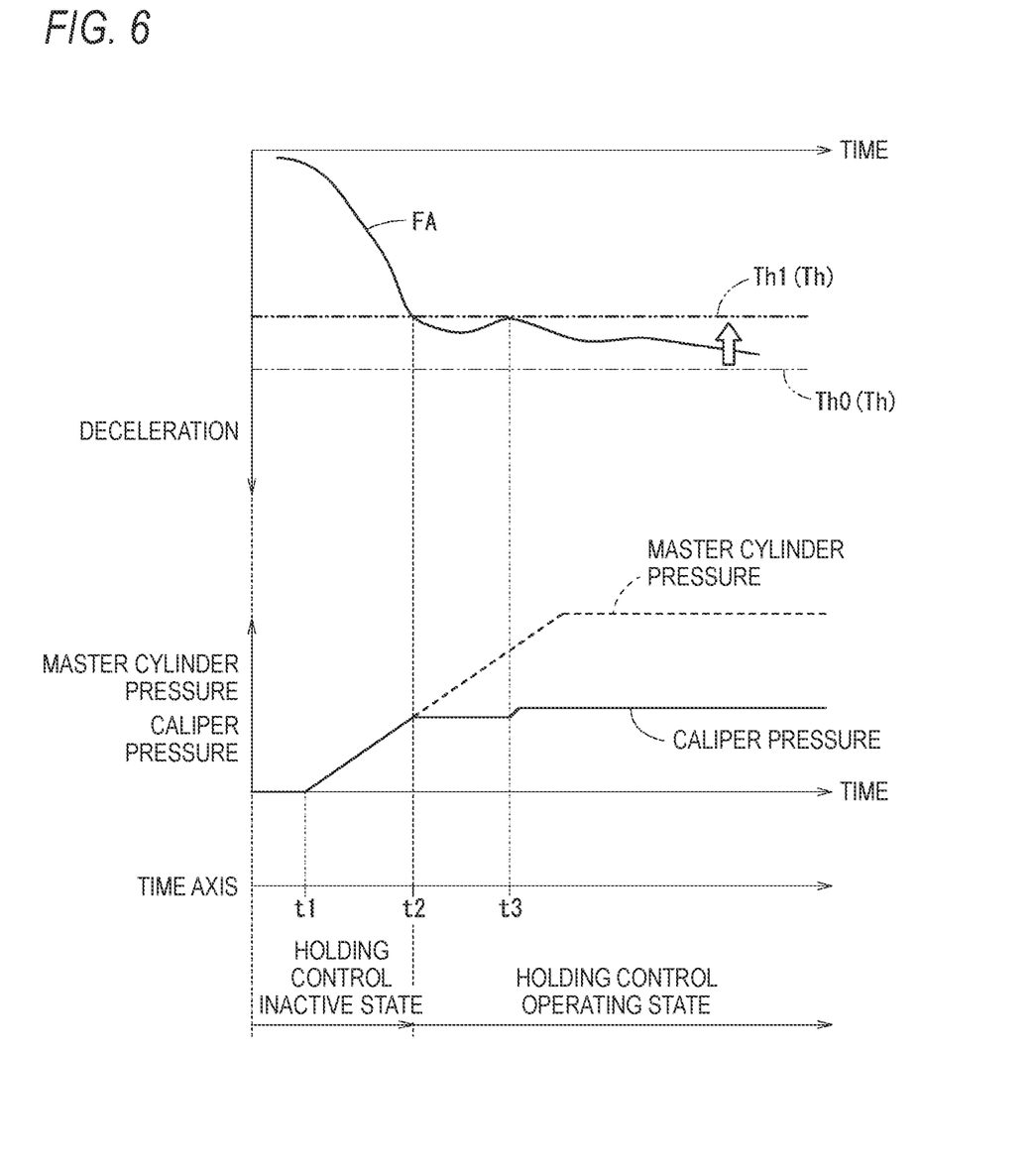
FIG. 6 is a time chart showing changes of a front wheel deceleration, a holding control threshold value and a caliper pressure by the control by the brake control device for vehicles with bar handle.

At a time point t1, the driver pulls the brake lever 24 to cause a brake fluid pressure (master cylinder pressure) at the first master cylinder 28, and the fluid pressure acts on the front wheel caliper 38F to brake the front wheel disk 36F. Consequently, the vehicle body 16 starts deceleration, and the front wheel deceleration FA calculated from the front wheel speed FV by the wheel deceleration calculation unit 72 also increases.

In this case, the determination unit 80 monitors the front wheel deceleration FA of the wheel deceleration calculation unit 72, that is, performs comparison with the holding control threshold value Th. When determining at a time point t2 that the front wheel deceleration FA has reached the holding control threshold value Th (is larger than or equal to the holding control threshold value Th in FIG. 6), the determination unit 80 instructs the valve control unit 82 to start the holding control. The determination unit 80 may perform time measurement after the front wheel deceleration FA is larger than or equal to the holding control threshold value Th and provide the instruction to perform the holding control based on the fact that the front wheel deceleration FA continues being larger than or equal to the threshold value for a predetermined time.

As the holding control, the valve control unit 82 closes the inlet valve 46F transmitting the fluid pressure of the master cylinder pressure to the front wheel caliper 38F by being normally open, based on the instruction to perform the holding control from the determination unit 80. Thereby, after the time point t2, while the master cylinder pressure increases, the caliper pressure is maintained, so that mutual fluid pressures become non-linking.

In the present embodiment, the holding control threshold value Th is changed to the low deceleration side according to the bank angle θ. For this reason, when the front wheel 18F decelerates while the vehicle 12 is cornering, the holding control can be started at an early stage. As a result, a slip of the front wheel 18F can be suppressed.

Moreover, while the holding control is being performed, the ECU 44 temporarily opens the inlet valve 46F at a time point t3 when the front wheel deceleration FA becomes close to the holding control threshold value Th (the corrected threshold value Th1). Thereby, the caliper pressure of the front wheel caliper 38F gently increases, so that a braking force can be applied to the front wheel 18F. Thereafter, for example, similar processing is performed until the front wheel deceleration FA becomes lower than the holding control threshold value Th (becomes the low deceleration side), and when the front wheel deceleration FA becomes lower than the holding control threshold value Th (becomes the low deceleration side), the holding control is ended. In this case, the valve control unit 82 allows the flow of the brake fluid to the front wheel caliper 38F by opening the inlet valve 46F. Further, when the front wheel deceleration FA is lower than or equal to the holding control threshold value Th, the holding control is performed again.

The control of the rear wheel brake 22R is also performed separately from the control of the front wheel brake 22F, and processing similar to the above is performed.

As described above, the control device 10 according to the present embodiment can perform the holding control at an appropriate time by correcting the holding control threshold value Th to the low deceleration side when the bank angle θ which is the inclined state of the vehicle 12 during cornering increases. That is, when the holding control threshold value Th changes to the low deceleration side, the holding control can be started at a stage where the front wheel deceleration FA and the rear wheel deceleration RA are low. Thereby, when a braking operation is performed while the vehicle 12 is cornering, the braking force of the wheel 18 is suppressed (appropriately distributed) at an early stage. Consequently, the stability of the vehicle 12 at the time of cornering can be further improved.

In this case, the control device 10 can allow the bank angle θ in a minute operation such as a lane change by starting the correction of the initial threshold value Th0 at a stage where the bank angle θ is larger than or equal to the bank angle threshold value α. And by increasing the correction amount as the bank angle θ increases, the holding control can be started at an earlier stage when the bank angle θ is large.

Moreover, the bank angle obtaining unit 74 can obtain a highly accurate bank angle θ by calculating the bank angle θ based on the acceleration in the horizontal direction of the vehicle 12, the roll angular speed and the yaw angular speed. Consequently, the holding control can be performed at a more appropriate time. Further, by obtaining a highly accurate deceleration by calculating the front wheel deceleration FA from the front wheel speed FV (or the rear wheel deceleration RA from the rear wheel speed RV) as the deceleration of the vehicle 12, the holding control can be performed at a far more appropriate time.

The present invention is not limited to the above-described embodiment and may be modified variously in accordance with the gist of the invention.

According to an aspect of the invention, there is provided a brake control device for vehicles with bar handle which is configured to perform a holding control to hold a brake fluid pressure that acts on a vehicle brake of a wheel of the vehicle, the brake control device comprising: a bank angle obtaining unit which is configured to obtain a bank angle of the vehicle; a deceleration obtaining unit which is configured to obtain a deceleration of the wheel; and a control unit which is configured to start the holding control when the deceleration reaches a holding control threshold value, the control unit which is configured to correct the holding control threshold value to a low deceleration side when the obtained bank angle increases.

According to the above, in the brake control device, when the bank angle which is the inclined state of the vehicle with bar handle being cornering increases, by correcting the holding control threshold value to the low deceleration side, the holding control can be performed at an appropriate time. That is, when the holding control threshold value changes to the low deceleration side, the holding of the braking pressure of the wheel can be started at a stage where the deceleration is low. Thereby, when a braking operation is performed while the vehicle with bar handle is cornering, the braking force of the wheel is distributed at an early stage and appropriately. Consequently, the stability of the vehicle with bar handle at the time of cornering can be further improved.

The control unit may be configured to start the correction of the holding control threshold value based on a fact that the bank angle is larger than or equal to a predetermined threshold value, and be configured to increase a correction amount of the holding control threshold value as the bank angle increases.

In the brake control device, by starting the correction of the holding control threshold value at a stage where the bank angle is larger than or equal to the predetermined threshold value, it can be suppressed that the holding control is performed at a bank angle in a minute operation such as a lane change. And by increasing the correction amount as the bank angle increases, the holding control can be started at an earlier stage when the bank angle is large.

The brake control device may further comprise a wheel speed obtaining unit which is configured to obtain a speed of the wheel from a wheel speed sensor that is configured to detect the speed of the wheel, and the deceleration obtaining unit may be configured to calculate the deceleration of the wheel based on the obtained speed of the wheel.

As described above, in the brake control device, by obtaining a highly accurate deceleration by calculating the deceleration of the wheel from the speed of the wheel as the deceleration of the vehicle with bar handle, the holding control can be performed at a far more appropriate time.

According to the present invention, the brake control device for vehicles with bar handle is capable of further improving the stability of the vehicle with bar handle by performing the holding control at an appropriate timing according to the bank angle at the time of cornering.

What is claimed is:

1. A brake control device for vehicles with a bar handle which is configured to perform a holding control to hold a brake fluid pressure that acts on a vehicle brake of a wheel of the vehicle, the brake control device comprising:
   a bank angle obtaining unit which is configured to obtain a bank angle of the vehicle;
   a deceleration obtaining unit which is configured to obtain a deceleration of the wheel; and
   a control unit which is configured to start the holding control when the deceleration reaches a holding control threshold value,
   the control unit is configured to correct the holding control threshold value to a low deceleration side when the obtained bank angle increases.

2. The brake control device according to claim 1, further comprising: a wheel speed obtaining unit which is configured to obtain a speed of the wheel from a wheel speed sensor that is configured to detect the speed of the wheel, wherein
the deceleration obtaining unit is configured to calculate the deceleration of the wheel based on the obtained speed of the wheel.

3. The brake control device according to claim 1, wherein the bank angle obtaining unit calculates the bank angle by combining an acceleration applied in a horizontal direction of the vehicle and components of roll angular speed and yaw angular speed, and
the holding control threshold value is set by a value corresponding to the deceleration.

4. The brake control device according to claim 1, wherein the control unit is configured to start the correction of the holding control threshold value when the bank angle is larger than or equal to a predetermined threshold value, and is configured to increase a correction amount of the holding control threshold value as the bank angle increases.

5. The brake control device according to claim 4, further comprising: a wheel speed obtaining unit which is configured to obtain a speed of the wheel from a wheel speed sensor that is configured to detect the speed of the wheel, wherein
the deceleration obtaining unit is configured to calculate the deceleration of the wheel based on the obtained speed of the wheel.

6. The brake control device according to claim 1, wherein the bank angle obtaining unit is a combination of an acceleration sensor and an angular speed sensor attached to the vehicle, and
the acceleration sensor is configured to detect an acceleration of not less than three axes.

7. The brake control device according to claim 6, wherein the bank angle obtaining unit is configured to receive a detection value Sa of the acceleration sensor and a detection value Sb of the angular speed sensor.

8. The brake control device according to claim 7, wherein the bank angle obtaining unit is configured to calculate the bank angle by combining the acceleration applied in a horizontal direction of the vehicle contained in the detection value Sa of the roll angular speed and yaw angular speed contained in the detection value Sb.

9. The brake control device according to claim 8, further comprising
a cornering state discrimination unit configured to discriminate a cornering state or a straight traveling state of the vehicle based on the bank angle.

10. The brake control device of claim 9, wherein the cornering state discrimination unit is configured to discriminate the cornering state of the vehicle when the bank angle is larger than or equal to a predetermined angle threshold value and the state continues for a predetermined time, and
the cornering state discrimination unit is configured to discriminate the straight traveling state of the vehicle when the bank angle is less than the predetermined angle threshold value or the state where the bank angle is larger than or equal to the predetermined angle threshold value is canceled immediately.

11. The brake control device according to claim 9, further comprising
a threshold value setting unit configured to set the holding control threshold value, and
the holding control is performed by comparing and determining the holding control threshold value with a front wheel deceleration or a rear wheel deceleration such that the holding control threshold value is set by a value corresponding to the deceleration.

12. The brake control device according to claim 11, wherein
the threshold value setting unit is configured to store an initial threshold value Th0 of the holding control threshold value when the bank angle is 0 degrees,
the initial threshold value Th0 is a predetermined value for starting the holding control when the deceleration occurs in the straight traveling state of the vehicle, and
at a time of the cornering state, when a correction amount is set with the bank angle, the threshold value setting unit is configured to calculate a corrected threshold value Th1 after moved to the low deceleration by adding the corrected threshold value Th1 to the initial threshold value Th0.

13. The brake control device according to claim 12, wherein
when the bank angle is lower than a bank angle threshold value α, the threshold value setting unit is configured to output the initial threshold value Th0, and when the bank angle is larger than or equal to the bank angle threshold value α, the threshold value setting unit is configured to output the corrected threshold value Th1 according to the bank angle.

14. The brake control device according to claim 13, further comprising
a determination unit configured to compare an actual deceleration of a front wheel with the holding control threshold value to determine in what state the front wheel deceleration is in with respect to the holding control threshold value.

15. The brake control device according to claim 14, wherein
when the front wheel deceleration becomes higher in the deceleration than the holding control threshold value, the start of the holding control is determined.

16. The brake control device according to claim 14, further comprising
a wheel speed obtaining unit configured to receive a front wheel speed and a rear wheel speed,
a wheel deceleration calculation unit configured to calculate a front wheel deceleration from the front wheel speed, and output the front wheel deceleration to the determination unit, and
the determination unit is configured to compare the front wheel deceleration with the holding control threshold value to determine whether to perform the holding control or not.

17. The brake control device according to claim 16, wherein
the determination unit is configured to perform a comparison with the holding control threshold value and, when determining at a time point that the front wheel deceleration has reached the holding control threshold value, the determination unit is configured to instruct a valve control unit to start the holding control.

18. The brake control device according to claim 17, wherein
the determination unit is configured to perform time measurement after the front wheel deceleration is larger than or equal to the holding control threshold value and provide an instruction to perform the holding control based on the front wheel deceleration continuing to be larger than or equal to the threshold value for a predetermined time.

\* \* \* \* \*